May 17, 1949.　　　　A. C. SHEPECK　　　　2,470,377
VIBRATING BLOCK MOLDING MACHINE

Filed June 10, 1947　　　　　　　　　　　3 Sheets-Sheet 1

Inventor
Albert C. Shepeck

By Clarence A. O'Brien
and Harvey B. Jacobson
Attorneys

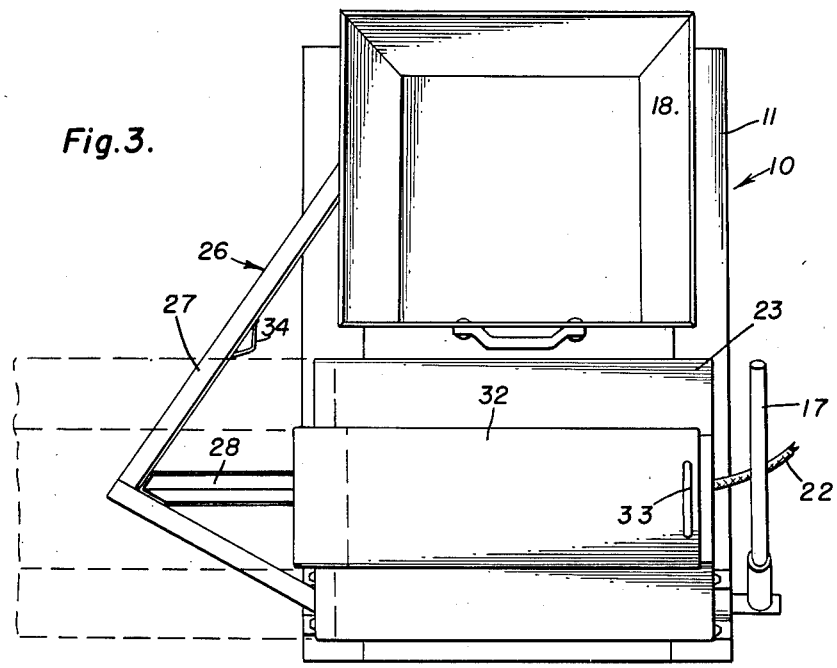
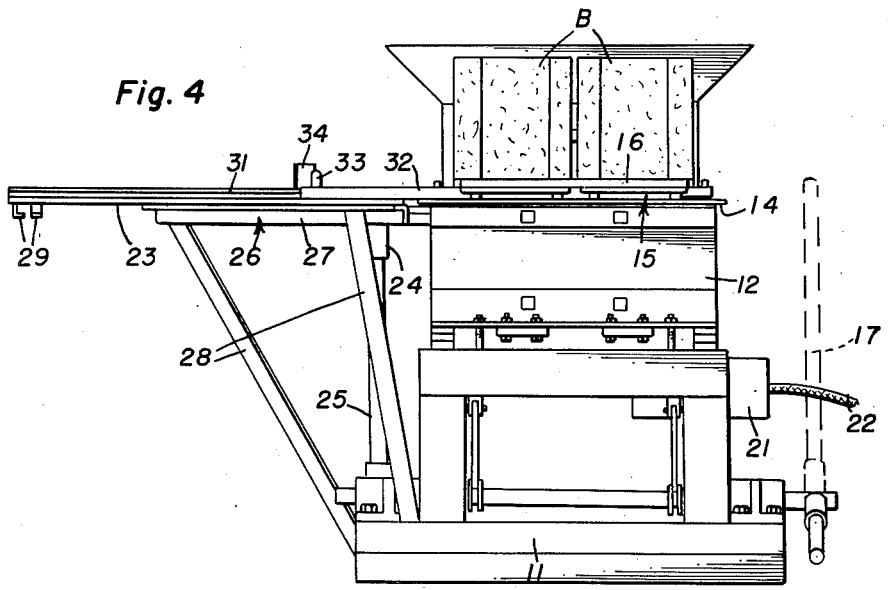

May 17, 1949.　　　　A. C. SHEPECK　　　　2,470,377
VIBRATING BLOCK MOLDING MACHINE
Filed June 10, 1947　　　　　　　　　　　　3 Sheets-Sheet 3

Inventor

Albert C. Shepeck

By *Clarence A. O'Brien and Harvey B. Jacobson*
　　　　　　　　　　　Attorneys

UNITED STATES PATENT OFFICE 2,470,377

VIBRATING BLOCK MOLDING MACHINE

Albert C. Shepeck, Menominee, Mich.

Application June 10, 1947, Serial No. 753,622

2 Claims. (Cl. 25—41)

This invention relates to an attachment for block molding machines and has for its primary object to produce a trowelled surface on the uppermost ends of cement blocks produced in machines of the vibratory type.

Another object is to facilitate the removal of the finished blocks from the machine and enable the machine operator rapidly to transfer the finished product from the machine to a suitable carrier for transportation to conventional curing kilns.

The above and other objects may be attained by employing this invention which embodies among its features a header plate pivoted to a block machine adjacent one corner of the mold box to swing in a horizontal arc into and out of a position to close the open upper end of the mold box, a guide on the upper side of the header plate, a slide on the guide adapted to be projected over the mold box to support a pallet and a formed block, and stop hooks on the under side of the header for engaging the mold box and holding the plate in mold box closing position during the formation of a block therein.

In the drawings:

Figure 3 is a view similar to Figure 1 showing the header plate swung into block trowelling position;

Figure 4 is an end view of the front end of a machine illustrating the finished blocks elevated and resting on the slide carried by the header plate;

Figure 1:
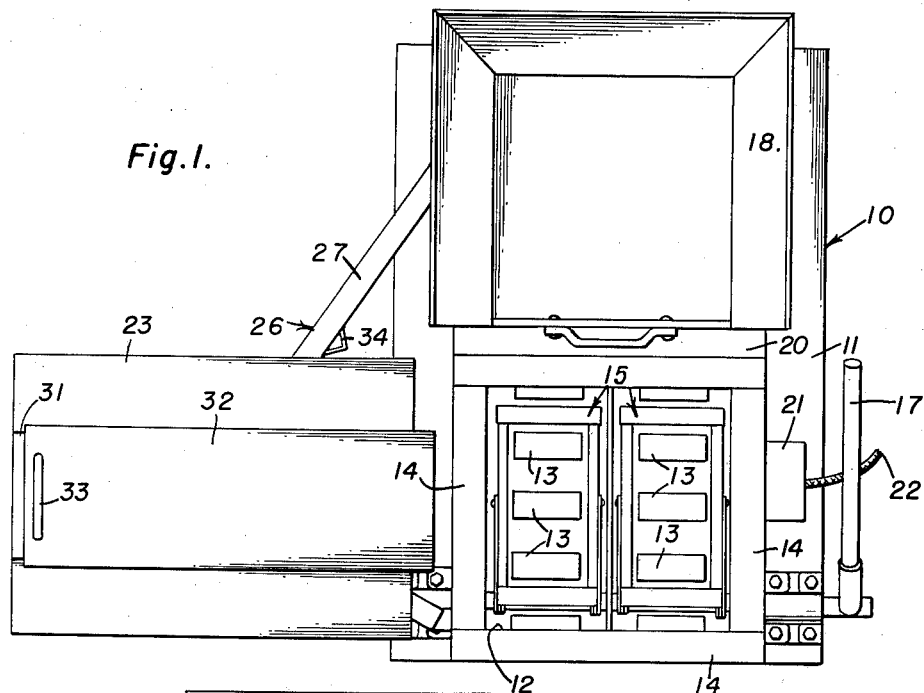
Figure 1 is a top plan view of a plastic block machine of the vibratory type, illustrating my improved header plate mounted thereon.
Figure 2:
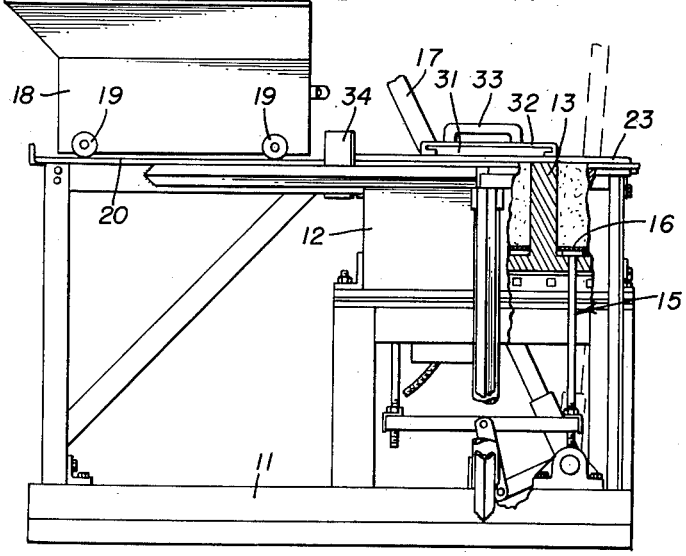
Figure 2 is a side view of the machine illustrated in Figure 1, showing the aggregate hopper withdrawn from its position over the mold box, and illustrating certain portions in section more clearly to illustrate certain details of construction.
Figure 5:
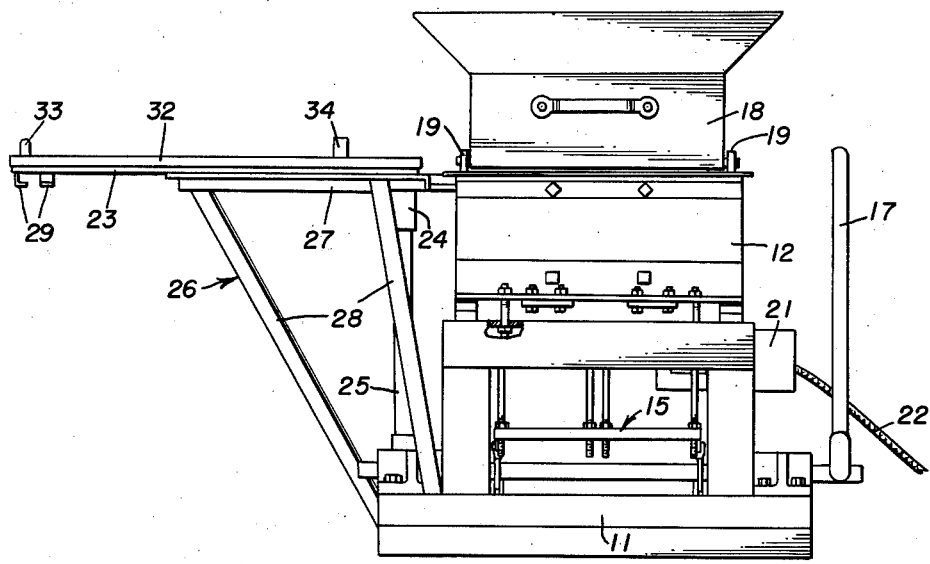
Figure 5 is a view similar to Figure 4 showing the parts in position for receiving the aggregate.
Figure 6:
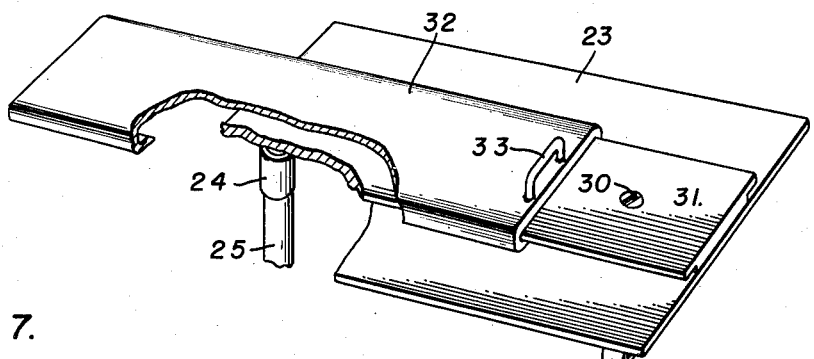
Figure 6 is a perspective view of the header plate and slide, certain portions being broken away to illustrate more clearly certain details of construction.

Referring to the drawings in detail a conventional block machine of the vibratory type is designated generally 10 and comprises a conventional base 11 on which is supported in spaced relation a mold box 12 containing the conventional cores 13. The sides and ends of the mold box are provided adjacent their upper edges with conventional outstanding reinforcing flanges 14, and the machine is equipped with a conventional pallet lifting mechanism designated generally 15 upon which a pallet 16 is normally supported within the mold box. The lift mechanism 15 is actuated by a hand lever 17 so that the finished blocks may be elevated on their palets clear of the upper end of the mold box. The mold box is filled with aggregate through the medium of a hopper 18 carrying rollers 19 which contact a table 20 on the same level with and adjacent the upper end of the mold box. The machine is equipped with a conventional vibrator 21 of the electrical type, the power to which is supplied through the medium of a flexible cord 22 all in a conventional manner. The machine so far described is of conventional form and in itself forms no part of this invention.

Figure 7:
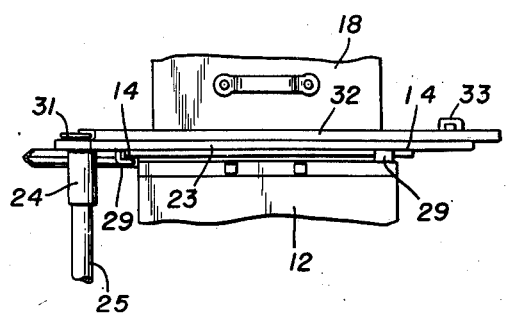
Figure 7 is a fragmentary front view showing the header plate over the mold box and the stop hooks of the header plate in mold box engaging position.

The invention herein referred to comprises a header plate 23 carrying intermediate its sides adjacent one end a depending collar 24 which is adapted to be fitted over the upper end of a post 25 rigidly fixed in a vertical position to the base 11. The under-side of the header plate swings in an arc about the vertical axis of the post 24 and coincidental with the plane of the upper end of the mold box 12 so that in one position the header plate may close the open upper end of the mold box to smooth the aggregate deposited therein by the hopper 18. In its other position, the header plate is supported on a suitable frame designated generally 26 and comprising a pair of horizontally disposed bars 27 having the upper edges disposed in a plane with the upper end of the mold box. The bars 27 are held in such position by suitable legs 28 which as illustrated are fixed at their lower ends to the frame 11 of the block machine. Depending from the under-side of the header plate 23 adjacent the end opposite the collar 24 are stop hooks 29 which as illustrated in Figure 7 are adapted to engage the flanges 14 when the header plate is swung into mold box closing position, in order to hold the header plate against rising from its position on the mold box.

Attached as by screws 30 to the upper side of the header plate 23 is a longitudinally extending T-shaped guide 31, and mounted to slide on the guide 31 is a slide 32 which as illustrated in Figure 4 is adapted to be projected across the upper end of the mold box 12 and directly beneath the pallet 16 on which finished blocks B are supported after their ejection from the mold box. A suitable handle 33 projects upwardly from the end of the slide 32 remote from the mold box, and carried by one of the supporting bars 27 is an upwardly projecting stop 34 which limits the movement of the header plate 23 and serves to properly align the slide 32 with the mold box during the removal of the blocks B from their position over the open end of the mold box.

In use the header plate is mounted on the post or column 25 as illustrated in the drawings, with the column located substantially midway between opposite ends of the mold box and adjacent one side thereof. With the frame 26 in place it will be obvious that when the header plate 23 is swung from its position over the mold box, it will be supported in a plane with the upper end thereof. With the header plate in this position the hopper 18 is filled with aggregate in the conventional manner and moved forwardly on the rollers 19 to a position on the mold box so that the aggregate from the hopper may be discharged into the mold box around the cores 13. It will be understood of course that a pallet 16 has been placed within the mold box before the introduction of the aggregate and that the pallet rests on the pallet elevating mechanism 15. With the aggregate resting on the pallet within the mold box, the vibrator 21 is set into operation and the hopper 18 is returned to its initial position whereupon the header plate 23 is swung into the position illustrated in Figure 3 to close the upper end of the mold box and trowel the upper surface of the blocks being formed therein. After the proper period of vibration, the vibrator 21 is cut off and the header plate 23 then is swung about the vertical axis of the standard 25 away from its position over the upper end of the mold box through an arc of 180 degree so as to rest against the stop 34 and on the frame 26. The lever 17 is then manipulated to operate the pallet elevating mechanism 15 so as to lift the finished blocks B on their pallet 16 clear of the upper end of the mold box as illustrated in Figure 4. The slide 32 is then advanced into a position beneath the pallet so that upon moving the lever 17 to drop the elevating mechanism 15 back into the mold box, the pallet with the finished blocks will be left standing on the slide 32. Upon grasping a handle 33 and withdrawing the slide 32 from its position over the upper end of the mold box it is obvious that the pallet and the blocks will be removed from their position over the mold box so that the latter is then clear for a repeat operation. Since the upper face of the slide is spaced from the upper face of the header plate 23 it will be obvious that the undersides of opposite ends of the pallet 16 will be spaced from the header plate so that the operator may grasp the pallet bearing the finished blocks and transfer it to a carrier for subsequent transportation to the curing kilns. Obviously the movement of the header plate over the fresh aggregate deposited within the mold box will effect a troweling of the surface of the aggregate, and after the block has been formed from the aggregate deposited within the mold it is obvious that upon swinging the header plate to clear the upper end of the mold a further troweling of the upper end of the block will result. In this way a smoothly finished upper end may be formed on a block produced in machines of the vibratory type.

It will be understood of course that the header plate 23 is held firmly against the top of the mold box 12 during the period of vibration thereof by the engagement of the hooks 29 under the flange 14, thus producing smooth top surfaces on blocks and improving the density thereof.

While in the foregoing there has been shown and described the preferred embodiment of this invention it is to be understood that minor changes in the details of construction, combination and arrangement of parts may be resorted to without departing from the spirit and scope of the invention as claimed.

Having described the invention, what is claimed as new is:

1. The combination with a block forming machine of the vibratory type having a mold box with an upper open end, a removable pallet within the mold box upon which the aggregate from which the block is formed and the completed block rests and means to lift the finished block and pallet clear of the upper end of the mold box, of a header plate pivotally supported on the machine adjacent the mold box to swing about a vertical axis into a position to close the upper open end of the mold box during the formation of a block therein, said header plate being also adapted to swing from its position over the mold box to a position adjacent one side thereof and means on the upper side of the header plate adapted to be projected over the open upper end of the mold box to support the pallet and a finished block.

2. An attachment for a block forming machine of the vibratory type having a mold box with an upper open end, a removable pallet within the mold box and means to lift the pallet clear of the upper end of the mold box, comprising a header plate pivoted to the machine adjacent one corner of the mold box to swing in a horizontal arc into and out of a position to close the upper open end of the mold box, a T-shaped guide on the upper side of the header plate and a slide on the guide adapted to be projected over the mold box to support a pallet and a finished block.

ALBERT C. SHEPECK.

REFERENCES CITED

The following references are of record in the file of this patent:

UNITED STATES PATENTS

| Number | Name | Date |
| --- | --- | --- |
| 1,442,122 | Brown | Jan. 16, 1923 |
| 2,303,884 | Krehbiel et al. | Dec. 1, 1942 |
| 2,314,577 | Dunn | Mar. 23, 1943 |